United States Patent [19]
Chant

[11] 3,800,879
[45] Apr. 2, 1974

[54] BEAN PULLER
[76] Inventor: Donald L. Chant, Rt. No. 4, St. Johns, Mich. 48879
[22] Filed: July 19, 1972
[21] Appl. No.: 273,096

[52] U.S. Cl.................... 171/104, 56/229, 172/276
[51] Int. Cl........................................... A01d 15/02
[58] Field of Search ..... 171/104; 56/229, 119, 15.9, 56/316; 172/276, 668, 298, 801

[56] References Cited
UNITED STATES PATENTS

| | | | |
|---|---|---|---|
| 1,876,562 | 9/1932 | Brown et al. | 172/276 |
| 2,709,326 | 5/1955 | Coombe | 56/229 |
| 3,441,091 | 4/1969 | Helling | 172/801 |
| 2,604,708 | 7/1952 | Washbond | 172/801 |
| 1,893,863 | 1/1933 | Kerns | 56/229 |

Primary Examiner—Antonio F. Guida
Attorney, Agent, or Firm—Miller, Morriss, Pappas & McLeod

[57] ABSTRACT

A bean puller or harvester of the front end mounting type for tractors which includes an hydraulic lift vertically connected eccentrically to a horizontal tool bar and having frame mounted push bars eccentrically positioned in respect to the tool bar and connecting linkage stabilizing movement of the tool bar so that the blades of the harvester engage the earth in a slightly ascendant manner, heel down and limited in depth of penetration by outboard gage wheels. The tool bar is provided with plural cutting blades and selected vine separators as needed leading the blades and the blades are fitted with trailing gathering tines which tend to guide the harvested crop as for windrowing for subsequent threshing.

6 Claims, 7 Drawing Figures

BEAN PULLER

The present invention is directed to a new and improved and vastly simplified front end bean harvester or puller capable of rapid movement in reasonably good bean ground and capable of continuing trouble free performance, easy mounting, adaptability to most major tractors, and which is easily field serviced or repaired.

Threshing beans has reached a fairly successful sophisticated level, but the harvesting of beans from row crop situations without losing substantial of the bean fruit has been something less than satisfactory for a wide variety of reasons. Land is rarely completely flat, is rarely consistent in chemical content and not unusally includes stones, submerged limbs and transitional soils, as from loamy to sandy, clays and hardpans and intermediate combinations of these, including occasional muck land. This requires a harvester or bean puller which can accomplish a rapid traverse of a bean field and still do a clean job of pulling and windrowing the bean plants for any subsequent operation and with minimum pulling trauma to the bean plants. The structure must be rugged, durable, easily repaired, and adaptable to a wide variety of basic machine elements such as tractors, and hydraulic control systems. It is the object of the present invention to meet these requirements with a bean puller having performance characteristics that evidences improved harvesting with minimum down time. It is another principal object of the present invention to provide a harvester mounted on the front of a tractor so that threshing equipment may be towed behind the tractor. Still another object is to provide a bean harvester having a thrust linkage so that as obstacles are met the heel of the blades are depressed and the puller rides over the obstacles.

The closest known prior art is represented by the U. S. Pats., No. 3,421,303 to Kammerzell; No. 2,709,326 to Coombe; No. 2,614,376 to Madsen; No. 2,466,555 to Paine; No. 1,893,863 to Kerns; No. 1,789,563 to Quinan; No. 1,318,527 to Bell; and No. 1,247,382 to Doane and Caswell. None of these devices show or suggest the suspension proposed in the present invention and the particular suspension makes possible relatively high speed performance.

Those skilled in the construction and use of bean pullers will readily appreciate the simplicity of the connections and the universal adaptability to a wide variety of tractors.

Figure 1:
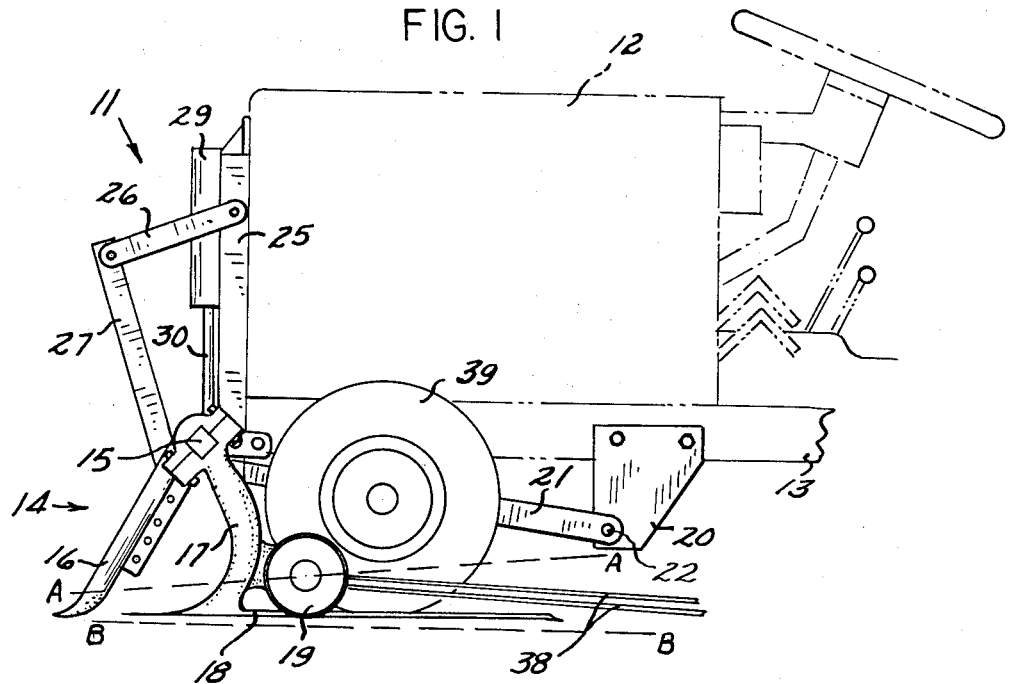
FIG. 1 is a side elevation view of a bean puller device in accord with the present invention and secured to the front end of a tractor.
Figure 7:
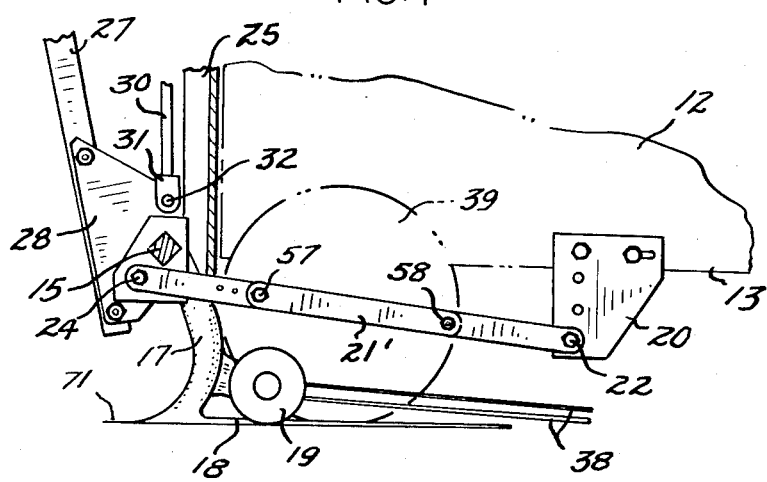

FIG. 7 is a side elevation view as in FIG. 1 but in a somewhat schematic cross section through the hydraulic mount to best reveal the suspension whereby impacting of the blade tends to allow a slight clockwise rotation as the blades are lowered allowing the heel to be pressed down and the tip to elevate so that the structure rides over obstacles encountered at high speed but without impairment of performance.

GENERAL DESCRIPTION

In general, a horizontal mounting bar is provided and the implement components of the bean puller are mounted on the bar and the bar, in turn, is removably secured to the front of a tractor and is connected to the frame of the tractor by a plurality of push rods which connect to the bar and also to the frame of the tractor. An hydraulic cylinder acting substantially vertically at the center of the front of the tractor is connectable to a lift plate secured to the mounting bar and this provides the drive means for lifting or lowering the horizontal bar and all attached work pieces or components. Stabilizer plates flanking the vertical ways supporting the hydraulic cylinder or motor guide the vertical movement of the bar. The push rods connect with the horizontal mounting bar by means of connection to a pair of thrust or push plates, each push plate is in spaced apart parallel registry on the mounting bar and hence apply (from the push rods) an eccentric thrust to the mounting bar below and slightly ahead of the axis of the horizontal mounting bar. The cutting blades include an arcuate frame portion and each frame has a ground engaging plate that, in operation, is submerged in the earth beneath the bean plants and is canted from toe to heel portion to slice all roots and gently break the soil around the base of the plants. The sole portion of the blades travels normally parallel to the ground level but canted into a slight ascending posture when the blade is pressed toward or into the ground. Gathering tines extend rearwardly from the blade frames and assist in windrowing the pulled or harvested plants. Vine splitters are provided which are located on the horizontal mounting bar between the blades. These are adjusted to slight earth contact only to raise and cut the row connected tendrils so that the windrows are cleanly formed. Gage wheels extend from the flank blade frames and are adjustable in accord with the desired running depth of the blades. The ground engaging contacts of the gage wheels are to the rear and under the horizontal bar and thus provide a fulcrum-like engagement intermediate the ends of the blades. The push rods, then, are secured to the tractor frame and are so adjusted in length that just prior to engagement with the earth the blades are substantially parallel and horizontal. This imparts through the push plate a powerful horizontal thrust at approximate bar working elevation and accommodates the unusual articulation and stability found in the present structure. As the blades are lowered to working depth, the heel is pressed into the earth and any shock loading causes the blades to ascend, tip first, giving the structure the ability to override obstacles and hence move rapidly across bean fields.

The push rods, the lift plates, and the push plates are adjustable to the specific operation as are the link elements and the cylinder elements. The lift plate permits manipulation of the whole bar toward and away from the earth so as to accomplish connection and disconnection to a tractor.

SPECIFIC DESCRIPTION

Referring to the drawings and most specifically to the FIG. 1 thereof, the bean puller or harvester 11 of the present invention is shown attached to the front end of a tractor 12 so as to be pushed by the tractor 12 from the lower frame 13 thereof and to accomplish a desired articulation of implement elements 14 as carried by the horizontal implement bar 15. The implements shown are the vine splitter 16, the blade frame 17 and included generally horizontal blade 18 and the gage wheel 19. In specific situations other implement elements 14, not shown, may be secured to the horizontal bar 15 and depend therefrom for articulation as herein described and ground engagement. An adaptor plate 20, which may in some instances be the frame portion 13 of the tractor 12, is secured as a rigid extension of the tractor frame 13 and supports the pivotal connection of the push rods 21 at the pivot 22. The preferred form of the pivot 22 is in the provision of a snap lock pin which is selectively removable for disconnect. Such pin devices are well known in the art. In some instances the adaptor plate 20 may include plural patterned optional pin positions to accommodate various selected mounting locations for the pin 22 and connection to the push rod 21. As will be seen as the description proceeds, the push rods 21 extend forwardly to eccentric pivotal connection with the horizontal bar 15 so that the driving thrust against the bar 15 is beneath and slightly ahead of the bar 15. This connection is accomplished at the push plates 23 by means of the removable pivot pin 24 (FIG. 2) which is preferably of the snap-lock type as described in reference to the opposite or rear end of the push rods 21.

Figure 2:
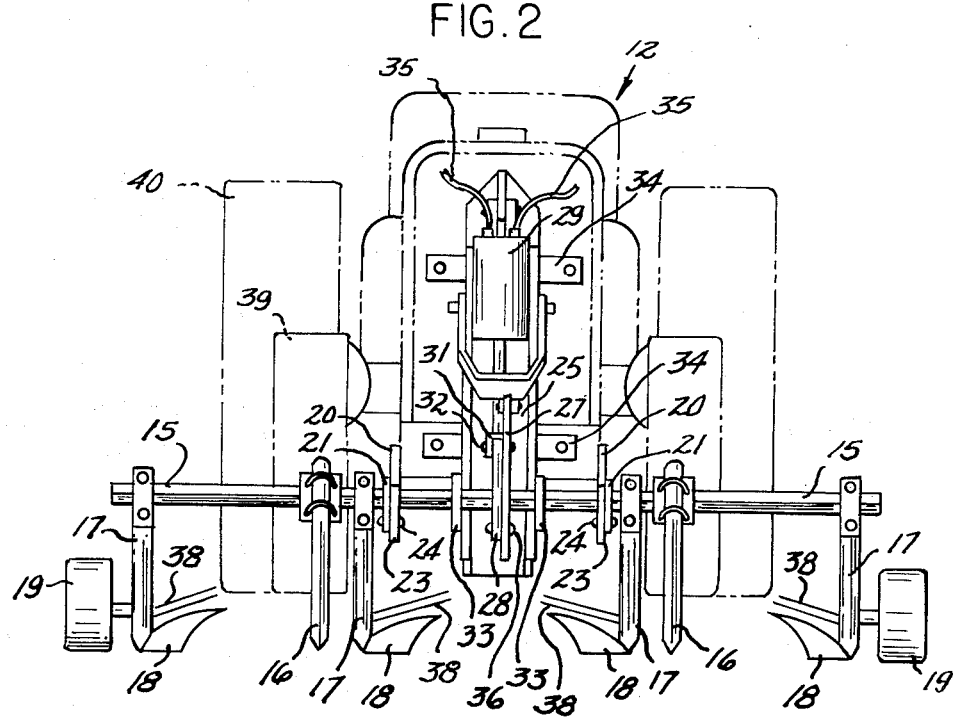
FIG. 2 is a front elevation view of the bean harvester shown in FIG. 1 and indicating the plural harvesting units mounted on the horizontal bar and fastened to a tractor.

A way element 25 is secured to the front of the tractor 12 as by welding or secure bolting. A yoke element 26 is pivotally secured straddling the way element 25 and the connecting link 27 pivoted from the free end of the yoke 26, the link 27 extending downwardly, as will be seen, to guiding connection with a lift plate 28 (FIG. 2). The lift plate 28 is also fixed to the bar 15 in a plane transverse to the axis of the bar 15 as are the push plates 23, previously described. However, the lift plate 28 is generally centered between the ends of the bar 15, while the push plates 23 are outboard therefrom and are substantially in line with an extension from the tractor frame 13. The way element 25 is in a channel-like form opening forwardly and the web portion thereof supports the cylinder or motor 29. The piston 30 is extendable and retractable in respect to the cylinder 29 and the dependently terminal end of the piston is provided with a clevis 31 which also is removably connected to the lift plate 28 by a removable pivot pin 32. As will be seen, the connection to the lift plate 28 is directly above the lift plate connection to the bar 15. The object of the cylinder 29 and its piston 30 is to raise and lower the bar 15 and guide plates 33 which flank the way element 25, and serve to stabilize the action of the motor 29 and the bar 15. The guide plates 33 are welded or otherwise secured to the bar 15 and are in a running fit relationship with the way element 25. The guide plates 33 are in planes transverse of the axis of the bar 15 and are welded or otherwise affixed to the bar 15 and extend rearwardly in spaced apart relation.

In the FIG. 2, the mounting brackets 34 are seen and these extend from the channel-shaped way 25 for fastening to the front of the tractor 12 as by bolts or welding so as to suspend the cylinder 29 and the piston 30 for operation on a vertical axis. Hydraulic leads 35 are connectable to the hydraulic system of the tractor for selected operation. Referring to FIG. 1, the line A—A represents the general attitude of the blades 18 when the entire apparatus 11 is lifted upward after hook-up. On lowering the blades 18 on the bar 15 via the cylinder 29, the ground engagement occurs at a substantially horizontal attitude. As ground penetration occurs, the attitude of the blades 18 changes slightly to an ascendant relationship shown in the line B—B. Further penetration exaggerates the ascendancy but allows the blades 18 to ride over obstacles while maintaining a blade running condition slightly beneath the earth surface which severs the roots and allows the plants to be gently swept into windrows. The actual horizontal blade elements 18 run in a horizontal attitude and may be separable and replaceable. The blades 18 have a sharp face surface and are canted rearwardly for complementing the windrowing. In this manner the blades 18 slide beneath the bean plants cutting off depending root growth so that surface swamping as by the tines 38 accomplishes ultimate gathering and windrowing.

When unhooked, the apparatus 11 rests on the flats of the blades 18. The tractor 12 is driven up centering the position of the link 27 on the lift plate 28 and the link is coupled to the lift plate 28 be attachment using the snap pin 36. Then the clevis 31 is dropped to couple with the lift plate 28 by running the piston 30 down to meet the lift plate 28. The snap pin 32 provides the pivot lock. Then the horizontal bar 15 and all connected apparatus is lifted by the hydraulic and the push rods 21 can then be connected to the tractor frame 13 by the pivotal connection 22 using a snap pin. Accordingly, only six pins need be connected, pin 36 to the link 27 and plate 28, pin 32 to the clevis and plate 28, and pins 22 to connect the push rods 21 to the frame 13 via adaptor plate 20. Pins 23 pivotally secure the forward ends of the push rods 21 to the push plates 23. The individual implements 14 may be suitably adjusted as to positioning and spacing directly on the bar 15 and the rearward trailing sweep tines 38 sweep the root freed plants gently into windrows adjusted to clear the trailing wheels 39 and 40 of the tractor 12. The tines 38 are adjustably secured to the blade frames 17.

Figure 3:
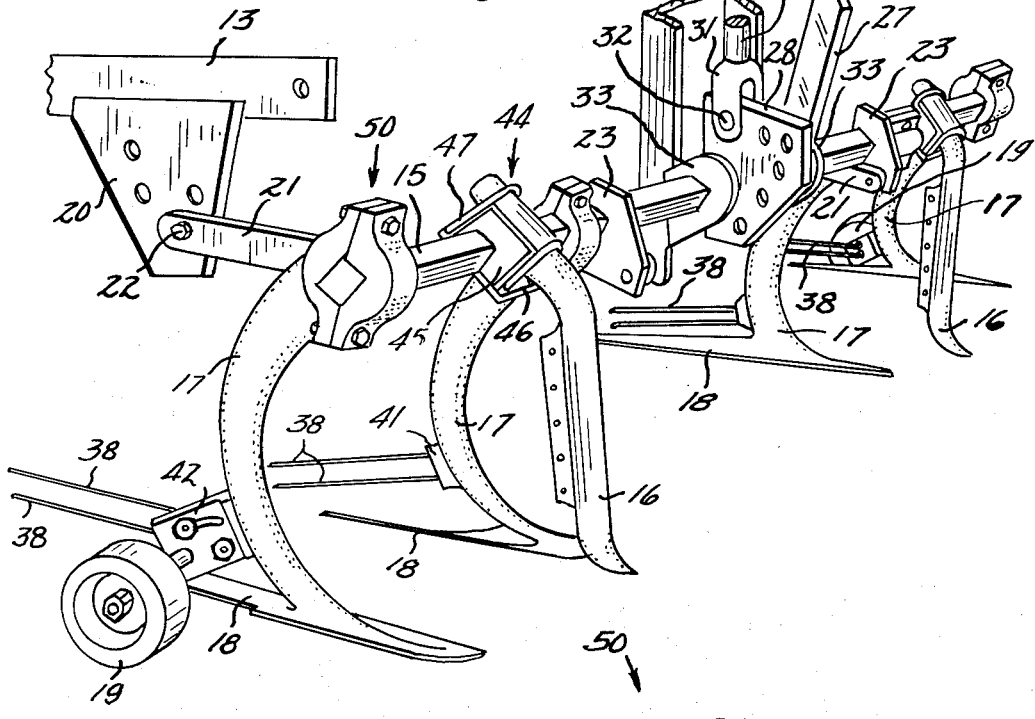
FIG. 3 is a perspective view of the structure of the present invention and indicating the chassis linkage and the hydraulic connections.

In the FIG. 3 the tabs 41 to which the tines 38 are welded or affixed are visible and the adjustability of the gage wheels 19 is readily appreciated using the adjusting plates 42 welded to the outboard blade frames 17 to carry the stub shafts 43. It is also seen that the mounting bar 15 supports the implement devices in a keyed manner by virtue of the square cross section of the bar 15 and to which bar 15 secure clamping can be accomplished. The clamp 44 which supports the cylindrical shank of the vine splitter 16 will be appreciated as comprising a portion 45 conforming to the irregular bar and a flatted back-up clamp plate 46 in compression on the bar 15 by tightening the tension girdles 47. Then the push plates 23 apply eccentric stressing as is also found in the lift plate 28 and linkage 30 and 27 therefor so that the implements 14 respond to the articulation imparted to them from the bar 15 and assisted by the fulcrum-like positioning of the gage wheels 19.

Figure 5:
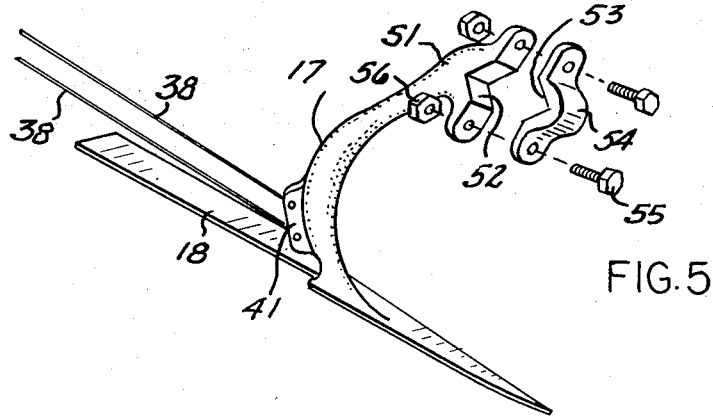
FIG. 5 is an exploded perspective view of the cutter arm and indicating the ease of attachment to the horizontal bar.

In FIG. 5 the clamp connection 50 is seen which allows the blade frames 17 to be adjustably retained on the bar 15. One base part 51 is notched ar right angles and the notch 52 faces the notch portion 53 of the opposed clamp element 54 and the bolts 55 and nuts 56 permit tight but selectively adjusted lock on the horizontal bar 15.

Figure 4:
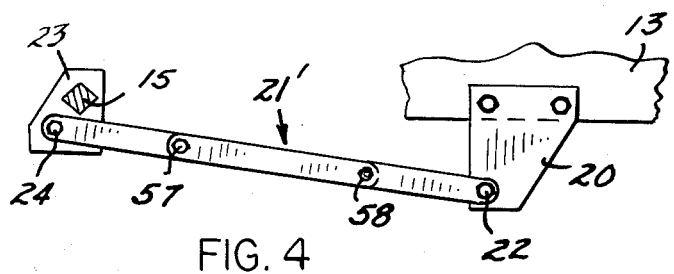
FIG. 4 is a fragmental side elevation of an adjustment variation as applied to the pusher arm and revealing the eccentric thrust applied to the bar.

The FIG. 4 illustrates the eccentric push rod linkage applying pushing force to the bar 15 at a point ahead of and slightly below the axis of the bar 15. The force is transmitted through the push plates 23. The push rod 21' actually shown illustrates a two link version allowing adjustability as to length by location of the two stiffening bolts 57 and 58. In some instances, the push rods 21 are curvalinear as necessary to clear axles or other obstructions extending from the tractor 12 or any specific tractor.

Figure 6:
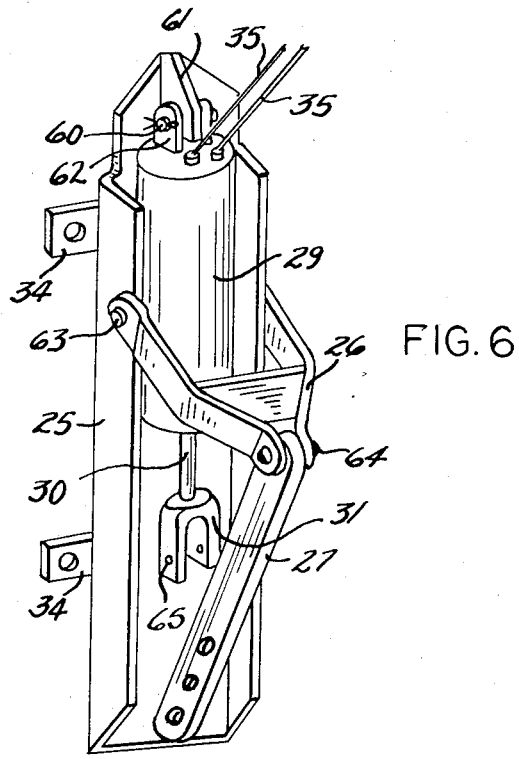
FIG. 6 is a perspective view of the hydraulic cylinder mounting and showing the simple yoke linkage required to accomplish machine hook-up for elevation adjustment.

In FIG. 6 the channel-like way member 25 is best seen with the brackets 34 extending therefrom for attachment to the front of a tractor 12. The cylinder 29 is best appreciated as being a double action cylinder having a pivot 60 through a tail piece 61 extending outward from the web of the way element 25 and through the mounting tabs 62 attached to the upper end of the double acting cylinder 29. The hydraulic lines 35 are attachable, as previously mentioned, to the tractor hydraulic system. The yoke element 26 is pivotally secured to the way member 25 intermediate the ends thereof and straddles the cylinder 29. The pivots 63 through the flanges of the way member 25 allow the yoke 26 to move up and down in accord with the movement in the stabilizing link 27 which has its pivot 64 at the end. The lower end of the link 27, as previously described, is connected selectively to the lift plate 28 best appreciated in FIG. 3. The piston 30, extendable and retractable by the cylinder 29, is terminally attached at its end to the lift clevis 31. The pivotal pin coupling 32, as previously described, passes through the openings 65 in the clevis 31 and through the lift plate 28. This arrangement, where the link 27 is connected ahead of the pivot pin 32, is an eccentric linkage which is stabilized by the relationship to the bar 15 as it is influenced by the eccentricity in the pusher linkage. This is best appreciated by the somewhat schematized cross section view seen in the FIG. 7.

In the FIG. 7 an adjustable push rod 21' is shown secured to the tractor frame 13 by means of the adjustable adaptor plate 20' and pivoted at the pin 22. The other end is eccentrically secured in respect to the horizontal mounting bar 15 by connection to the push plate 23 at a point ahead of and beneath the axis of the bar 15. Meanwhile, the plate 28, after hook-up, is held in a selected elevational posture by the rod 30 under hydraulic direction from the cylinder 29 acting directly over the horizontal bar 15 to raise or lower the bar 15. The guide plates 33, provide lateral support in their astraddle relation of the rails of the way element 25. (These can't be seen well in the FIG. 7 but are visible in FIGS. 1 and 3.) The link 27 pivoting on pivot 63 assures a counterpoise to the pushing eccentric and allows the accomplishment of only limited ascendant attitude depending upon the force on the lift plate and the imbalance in force as can be encountered by the blades 18 in continuous uses. The blades 18 travel in substantially parallel attitude but when obstructions are encountered, the only possible motion is a climbing motion tending toward emergence of the blade tip 71 and in avoidance of the tendency in other devices to "nose dive."

In operation, once the mounting plates 20 have been attached to the tractor 12 and the slide element 25 has been secured to the front of the tractor in a substantially vertical position with the cylinder 29 coupled to the hydraulic power, the mounting of the bean puller 11 is accomplished in a matter of minutes after all adjustments have been made and secured for running attitude. In speed, the unit as presently described harvests and windrows at 10 to 12 percent improved performance over presently used devices which are towed once operator confidence is gained. The machine functions with a minimum loss of fruit, and the implement elements are easily repaired, replaced, or varied to suit particular field operating conditions. Failures are infrequent and the forward positioning of the bean puller frees the rear of the tractor for threshing or other continuous and simultaneous operation.

Having thus described my invention others skilled in the art will readily appreciate changes, modifications and improvements therein and such changes, modifications and improvements are intended to be included herein limited only by the scope of my hereinafter appended claims.

I claim:

1. A bean puller for attachment to the front end of a tractor comprising:

a horizontal mounting bar;

a lift plate secured to said mounting bar intermediate the ends thereof and having a pair of connector elements, one substantially above said bar and one somewhat ahead and beneath said bar, said lift plate in a plane perpendicular to the axis of said bar;

a lift element operably connected to said lift plate;

a link element connected to said lift plate;

a yoke element pivotally secured to said lift element and pivotally secured to the upper end of said link element;

a pair of push rods eccentrically secured at one end to said bar in spaced relation outboard of said lift plate and having securing means at the other ends thereof for attachment to a tractor frame; and a plurality of implement components adjustably secured to said mounting bar.

2. A bean puller for attachment to the front end of a tractor comprising:

a horizontal mounting bar;

a lift plate secured to said mounting bar intermediate the ends thereof and having a pair of connector elements, one substantially above said bar and one somewhat ahead and beneath said bar, said lift plate in a plane perpendicular to the axis of said bar;

a pair of push rods eccentrically and pivotally secured to said bar in spaced relation outboard of said lift plate at one end and having securing means at the other end for attachment to a tractor frame;

harvest implements removably secured to said bar in depending relation;

a way element having connecting means to the front of a tractor and pivotally supporting a yoke element with a link secured to the end of said yoke, said link connected to said second mentioned connection of said lift plate;

stabilizer plates straddling said way element and secured to said bar whereby said bar is guided on said way element and in reduction of end play;

gage wheels secured to said harvest elements and located rearwardly and beneath said horizontal bar; and an hydraulic motor connectable to said first connection of said lift plate for raising and lowering said bar.

3. A bean puller or harvester in accord with claim 2 wherein said push rods are provided at their tractor connecting ends with a pivotal connection.

4. A bean puller or harvester in accord with claim 2 wherein said gage wheels are adjustably secured to said harvest elements.

5. A bean puller or harvester in accord with claim 2 wherein said implements include horizontal cutting blades on arcuate frames, vine splitters and windrowing tines secured to and trailing said blade frames.

6. A horizontal implement mounting bar having a control lift plate secured thereto, a pair of stabilizer plates in spaced apart flanking relation to said lift plate, and a pair of spaced apart push plates all of said plates being perpendicular to said bar, the said lift plate having two connections, one above said bar and one forwardly of said bar, and the said push plates having registering eccentric connections ahead of and beneath said bar;

a pair of push rods pivotally connectable on each side of a tractor frame and extending forwardly to pivotal connection with said push plates;

a channel-like way member having an upper pivotal support and an intermediate pivot and said flanges of said way member slidably engaging said stabilizer plates in a bearing relation;

a motor pivotally connected to said upper pivotal support of said way member and connected to said first mentioned connection of said lift plate;

a yoke element connected to said intermediate pivot on said channel-like way member and having a connecting link extending downward to connection with said lift plate at said second mentioned connection; and harvest implementing blades, blade frames and windrowing elements removably secured in selected spaced apart relation on said mounting bar and gaged to enter the earth in a substantially horizontal plane and penetrate the earth in a slightly ascendant attitude and urged eccentrically forwardly by said push rods.

* * * * *